(12) United States Patent
Kodama et al.

(10) Patent No.: US 10,153,825 B2
(45) Date of Patent: Dec. 11, 2018

(54) VEHICLE-MOUNTED CONTROL DEVICE

(71) Applicant: DENSO CORPORATION, Kariya, Aichi-pref. (JP)

(72) Inventors: Tomoko Kodama, Kariya (JP); Takeshi Enosaki, Kariya (JP); Hiroto Tanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 23 days.

(21) Appl. No.: 15/117,910

(22) PCT Filed: Feb. 6, 2015

(86) PCT No.: PCT/JP2015/000553
§ 371 (c)(1),
(2) Date: Aug. 10, 2016

(87) PCT Pub. No.: WO2015/122166
PCT Pub. Date: Aug. 20, 2015

(65) Prior Publication Data
US 2016/0359545 A1    Dec. 8, 2016

(30) Foreign Application Priority Data
Feb. 13, 2014   (JP) ................................ 2014-025380

(51) Int. Cl.
*H04B 7/155*   (2006.01)
*H04W 4/04*   (2009.01)
(Continued)

(52) U.S. Cl.
CPC ....... *H04B 7/15507* (2013.01); *H04L 12/407* (2013.01); *H04L 67/12* (2013.01); *H04W 4/046* (2013.01)

(58) Field of Classification Search
CPC .... H04B 7/15507; H04W 4/046; H04L 67/12; H04L 12/407
See application file for complete search history.

(56) References Cited

U.S. PATENT DOCUMENTS 7,664,133 B2 * 2/2010 Nichols ................. G06F 13/374
370/447
2008/0101393 A1 5/2008 Noumi et al.
(Continued)

FOREIGN PATENT DOCUMENTS

JP   S62066360 A   3/1987
JP   2006237832 A * 9/2006
(Continued)

OTHER PUBLICATIONS

Bosch, CAN Specification Version 2.0, Apr. 5, 1995.*

*Primary Examiner* — Shailendra Kumar
(74) *Attorney, Agent, or Firm* — Harness, Dickey & Pierce, P.L.C.

(57) ABSTRACT

A vehicle-mounted control device, which communicates with a vehicle-mounted node via a common bus and follows a communication protocol that the lower the priority of a data frame output from the vehicle-mounted node, the longer a waiting time, includes: an arbitration device that suspends transmission of the transmission target frame to the bus when the priority of a transmission target frame is lower than an output data frame from the vehicle-mounted node, and continues transmission of the transmission target frame to the bus when the priority of the transmission target frame is higher than the output data frame; and a change device that changes the priority of the transmission target frame to be the highest of all data frames when the transmission of the transmission target frame is suspended for a prescribed time or longer as a result of arbitration control by the arbitration device.

4 Claims, 7 Drawing Sheets

(51) Int. Cl.
*H04L 29/08* (2006.01)
*H04L 12/407* (2006.01)

(56) References Cited

U.S. PATENT DOCUMENTS

| | | | | |
|---|---|---|---|---|
| 2010/0131816 | A1* | 5/2010 | Yamamoto | H04L 12/4013 |
| | | | | 714/749 |
| 2014/0036693 | A1* | 2/2014 | Mabuchi | H04L 43/10 |
| | | | | 370/243 |

FOREIGN PATENT DOCUMENTS

| | | | | |
|---|---|---|---|---|
| JP | 2006237832 | A | | 9/2006 |
| JP | 2008113096 | A | | 5/2008 |
| JP | 2008172709 | A | * | 7/2008 |
| JP | 2008172709 | A | | 7/2008 |

* cited by examiner

VEHICLE-MOUNTED CONTROL DEVICE

CROSS REFERENCE TO RELATED APPLICATIONS

This application is a U.S. National Phase Application under 35 U.S.C. 371 of International Application No. PCT/JP2015/000553 filed on Feb. 6, 2015 and published in Japanese as WO 2015/122166 A1 on Aug. 20, 2015. This application is based on and claims the benefit of priority from Japanese Patent Application No. 2014-025380 filed on Feb. 13, 2014. The entire disclosures of all of the above applications are incorporated herein by reference.

TECHNICAL FIELD

The present disclosure relates to a vehicle-mounted control device that is mounted in an automobile.

BACKGROUND ART

There has been known a vehicle-mounted communication system mounted in an automobile and provided with at least one piece of vehicle-mounted equipment (node) connected to a bus, and a gateway that relays communication between nodes connected to mutually different buses (see Patent Literature 1).

In this kind of vehicle-mounted communication system, data is transmitted and received by use of a protocol defined for each bus, and as the protocol, a CAN (Controller Area Network) protocol, a LIN (Local Interconnect Network) protocol, or the like, is used.

A general gateway mounted in the automobile outputs data received from the node to a defined bus in accordance with routing information. In the gateway, when data frames are to be outputted to a CAN bus, the data frames are outputted to the CAN bus sequentially in order of reception in the gateway itself from each node (namely, the gateway functions as a FIFO buffer). The CAN bus mentioned here is a bus that transmits and receives data by use of the CAN protocol.

In the CAN protocol, a head portion of a data frame includes a CAN-ID. This CAN-ID is an identifier that identifies a transmission source node and contents of data set in a subsequent region, and is set for each data frame.

In the CAN protocol, when the bus is empty, the nodes transmit data frames to the bus, respectively. However, there are cases where data frames are simultaneously transmitted from the respective nodes to the bus.

In this case, in the CAN protocol, it is defined so as to perform arbitration control in which a data frame with the smallest logical value of the CAN-ID is regarded as a data frame with the highest priority, and the node having transmitted that data frame obtains a transmission right.

Hence in the gateway, in a case where a data frame to be transmitted to the CAN bus (hereinafter referred to as a "transmission target frame") is received from a bus different from the CAN bus, when the transmission target frame has a low priority, it may continue to lose the arbitration over the transmission right against the other nodes.

When the node continues to lose the arbitration over the transmission right, there occurs a problem where a long period of time is required in the gateway until transmission of the transmission target frame to the CAN bus.

That is, the conventional vehicle-mounted control device has a problem where a retention time until transmission of a data frame to the bus can be long.

PRIOR ART LITERATURES

Patent Literature

Patent Literature 1: JP-2008-113096-A

SUMMARY OF INVENTION

It is an object of the present disclosure to reduce a retention time until transmission of a data frame to a bus in a vehicle-mounted control device that follows a communications protocol defined such that the lower the priority having been set to each data frame, the longer the waiting time until transmission of the data frame to the bus.

According to an aspect of the present disclosure, a vehicle-mounted control device which communicates with at least one vehicle-mounted node via a common bus, sets a priority to a data frame that is outputted from the at least one vehicle-mounted node, and follows a communication protocol defined in such a manner that the lower the priority, the longer a waiting time until transmission to the bus, the vehicle-mounted control device includes: an arbitration device that performs arbitration control to arbitrates transmission of a transmission target frame in such a manner that: a data frame to be transmitted to the bus is defined as the transmission target frame; when the transmission target frame collides with an output data frame from the vehicle-mounted node, and the priority of the transmission target frame is lower than the priority of the output data frame from the vehicle-mounted node, the arbitration device suspends the transmission of the transmission target frame to the bus; and when the transmission target frame collides with the output data frame from the vehicle-mounted node, and the priority of the transmission target frame is higher than the priority of the output data frame from the vehicle-mounted node, the arbitration device continues the transmission of the transmission target frame to the bus; and a change device that performs a change control to change the priority of the transmission target frame so as to be the highest of all data frames when the transmission of the transmission target frame is suspended for a time equal to or longer than a preliminary defined prescribed time as a result of the arbitration control by the arbitration device.

That is, in the present vehicle-mounted control device, when a waiting time until transmission of a transmission target frame to the bus reaches a prescribed time or longer, a priority of the transmission target frame is changed so as to be the highest of all data frames. Hence the transmission target frame with the changed priority can reliably obtain a transmission right to the bus, and is transmitted to the bus.

Thus, according to the vehicle-mounted control device, it is possible to prevent the transmission target frame from continuing to lose arbitration for a time significantly longer than a prescribed time, and thereby to achieve early transmission of the transmission target frame to the bus.

In other words, according to the above device, it is possible to reduce a retention time required until transmission of a data frame in a vehicle-mounted communication system in which a plurality of vehicle-mounted nodes communicate with each other via a common bus and a priority is set to each data frame that is transmitted from the vehicle-mounted node, and which follows a communications protocol defined such that the lower the priority, the longer the waiting time until transmission to the bus.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, an embodiment of the present disclosure is described along with the drawings.

<Vehicle-Mounted Communication System>

Figure 1:
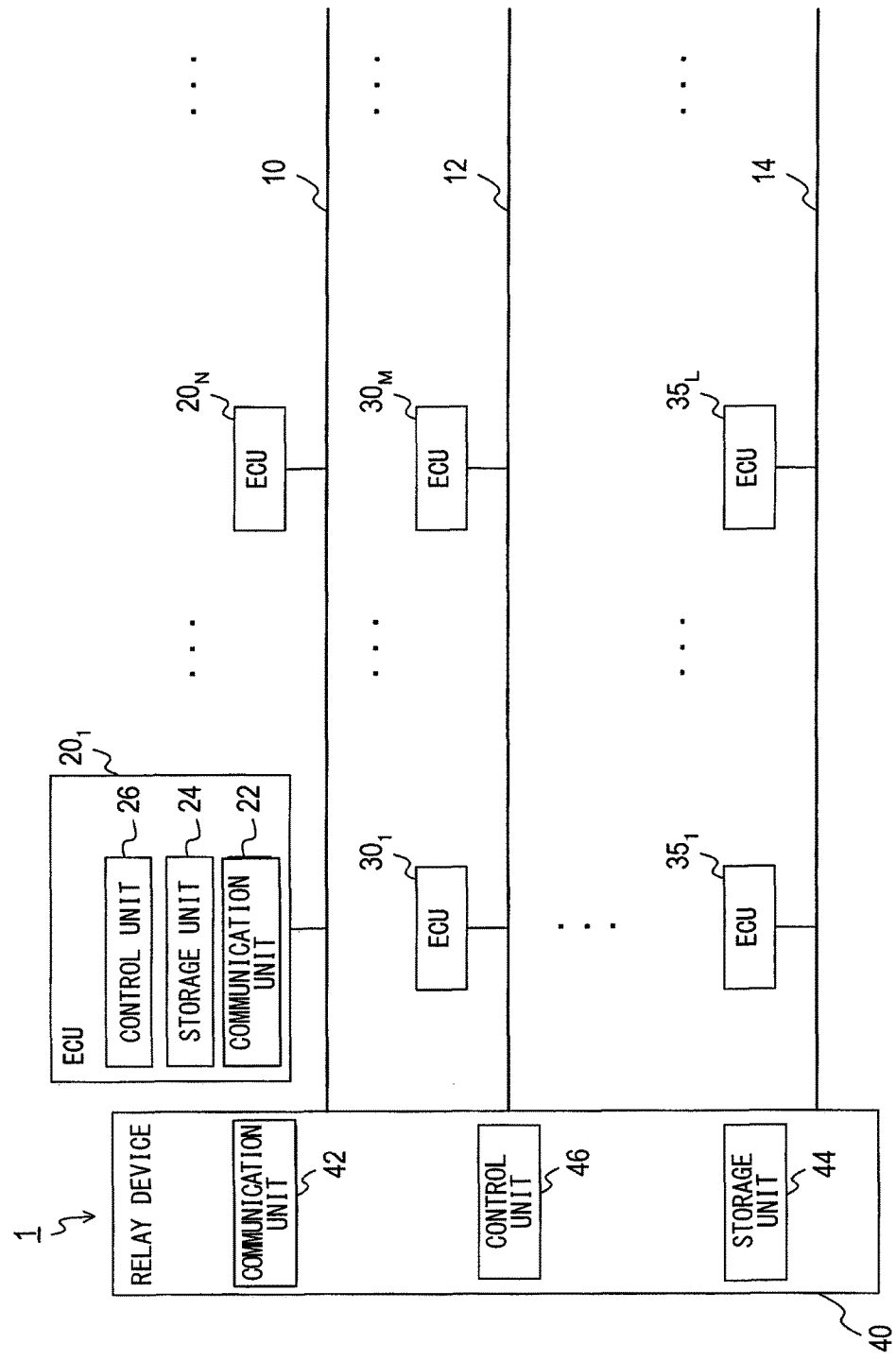
FIG. 1 is a block diagram showing a schematic configuration of a vehicle-mounted control system provided with a relay device as a vehicle-mounted control device to which the present disclosure is applied.

A vehicle-mounted communication system 1 shown in FIG. 1 is a communication system mounted in an automobile, and is a system where necessary information is communicated between the vehicle-mounted nodes.

This vehicle-mounted communication system 1 is provided with electronic control units (hereinafter referred to as ECUs) 20, 30, 35 as the vehicle-mounted nodes, and a relay device 40.

ECUs $20_1$ to $20_N$ in the present embodiment are connected to a bus 10. ECUs $30_1$ to $30_M$ are connected to a bus 12. ECUs $35_1$ to $35_L$ are connected to a bus 14. Here, the indexes N, M, L represent the numbers of ECUs 20, 30, 35, and each are a positive integer larger than "1".

Note that the bus 10, the bus 12, . . . , the bus 14 are different from each other. Communication among the ECUs 20, 30, 35, is performed using different communication protocols for the respective buses 10, 12, 14.

In the present embodiment, FlexRay is used for communication in the bus 12, and Lin (Local Interconnect Network) is used for communication in the bus 14.

Further, in the present embodiment, the CAN ("Controller Area Network" proposed by Robert Bosch GmbH) protocol is used for communication in the bus 10.

<ECU>

The ECU 20 is provided with a communication unit 22, a storage unit 24, and a control unit 26, and the control unit 26 executes a processing program, to achieve a previously allocated function.

In accordance with the protocol used in the bus 10, the communication unit 22 transmits data to and fetches data from the bus 10 which the communication unit 22 itself is connected to. The storage unit 24 is a nonvolatile storage device that holds stored contents and can rewrite the stored contents even when power supply is shut down (namely, during power-off). The control unit 26 is mainly configured of a known microcomputer including at least a ROM, a RAM, and a CPU.

The control unit 26 of the ECU 20 performs function achievement processing for achieving a function allocated to the ECU 20 itself, and performs communication processing for performing communication with the other ECUs 20, 30, 35.

The storage unit 24 stores a processing program to cause the control unit 26 to perform, as part of the communication processing, reception processing for fetching data from the bus 10 where communication is being performed using the CAN protocol.

Examples of the ECU 20 in the present embodiment include an engine ECU that controls an internal combustion engine, a power train ECU that controls a power train mechanism, a brake ECU that controls a brake function, and the like.

Note that the ECUs, 30, 35 in the present embodiment are configured similarly to the ECU 20 except that the communication protocols are different. Hence detailed descriptions of the ECU 30, 35 are omitted.

Examples of the ECUs 30, 35 in the present embodiment include a window ECU that controls a power window, a mirror ECU that controls an electric mirror, an air conditioner ECU that controls a vehicle-mounted air conditioner, a wiper ECU that controls a wiper mechanism, and the like.

<Outline of CAN Protocol>

Next, a description is given of an outline of the CAN protocol for use in communication in the bus 10.

In the CAN protocol, when the ECU 20 and the relay device 40 confirm that the bus 10 is empty, the ECU 20 and the relay device 40 transmit data frames to the bus 10.

However, when data frames are simultaneously transmitted from at least two ECUs 20 or from the ECU 20 and the relay device 40 (i.e., when data frames collide with each other), arbitration control is performed in the CAN protocol. The arbitration control mentioned here is a known control in which, in accordance with a priority previously defined for each data, transmission of a data frame with a high priority is prioritized while a data frame with a low priority is suspended.

Figure 2:
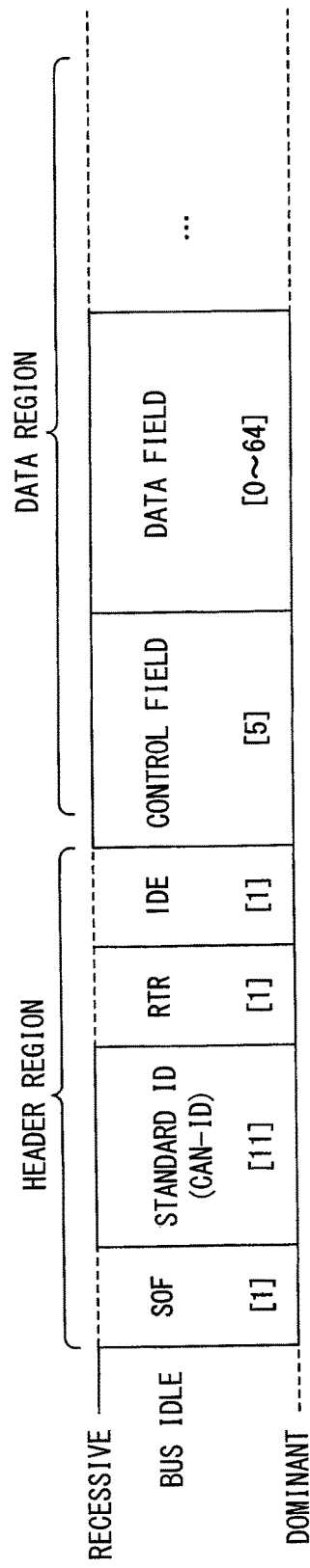
FIG. 2 is a view for explaining a data frame in a standard format in a CAN protocol.

As shown in FIG. 2, the data frame includes at least a header region, and a data region that follows the header region.

Of the header region and the data region, the header region includes at least an SOF, a standard ID, an RTR, and an IDE in this order. Note that a numerical value in a square bracket ([ ]) in FIG. 2 is a data size (bits) of each of the regions.

The SOF is a 1-bit signal that represents the start of the data frame, and the SOF shifts to a low level ("0") when transmission of the data frame is started. The RTR is a signal that identifies a data frame and a remote frame.

The IDE is a 1-bit signal that represents whether an extended ID, detailed later, is included. When the IDE is at the low level, it represents that the extended ID is not included. When the IDE is at a high level ("1"), it represents that the extended ID is included.

The standard ID is a signal that represents identification information of contents of data included in the data frame, and of the ECU having transmitted the data frame. This identification information is binary data having a data size with a prescribed data length (11 bits in the present embodiment), and is a CAN-ID being an identifier unique (peculiar) to each data frame. However, as a logical value of the CAN-ID previously allocated to the data frame, "00000000000 (binary notation)" is excluded. Note that the CAN-ID is an example of the data information.

The data region includes data itself (a data field) to be transmitted to the bus 10. Further, the data region includes at least size information (a control field) that shows a data size, and a CRC symbol for checking the presence or absence of an error.

The bus 10 is configured such that, when a signal at the high level and a signal at the low level are simultaneously outputted from the ECU 20 or the relay device 40, the signal level on the bus 10 is the low level.

That is, as for the signal level on the bus 10, the low level ("0") is a dominant level and the high level ("1") is a recessive level. Thus, when data frames are simultaneously transmitted to the bus from at least two ECUs 20 or from the ECU 20 and the relay device 40, the signal at the low level is prioritized.

In the CAN protocol, since a data frame is transmitted by one bit, the smaller the logical value of the CAN-ID, the higher priority of the data frame it means. That is, when the logical values of the CAN-ID (standard ID) are "00000000000 (binary notation)", they represent that the priority is the highest.

<Relay Device>

The relay device 40 shown in FIG. 1 is a device having a gateway function to relay communication among the ECUs 20, 30, 35 connected to the buses 10, 12, . . . , 14, to which mutually different protocols have been set.

This relay device 40 is provided with a communication unit 42, a storage unit 44, and a control unit 46.

The communication unit 42 transmits data to the buses 10, 12, . . . , 14, and fetches data from the buses 12, 14, . . . 16. The storage unit 44 is a nonvolatile memory that holds stored contents and can rewrite the stored contents during power-off. The control unit 46 is mainly configured of a known microcomputer including at least a ROM, a RAM, and a CPU.

Further, the relay device 40 is provided with a power supply unit (not shown) that converts electric power supplied from a vehicle-mounted battery to electric power required for activation of the relay device 40 itself, and a clock generation unit (not shown) that generates a clock signal.

The storage unit 44 stores processing program for causing the control unit 46 to perform relay processing for achieving transmission and reception of data among the ECUs 20, 30, 35 connected to the mutually different buses 10, 12, 14, in accordance with routing information. The routing information mentioned here is information that represents a communication route of data among the ECUs 20, 30, 35 connected to the mutually different buses 10, 12, 14, and is stored in the storage unit 44.

In the relay processing, when frames (i.e., data) to be outputted to the bus 10 in which the communication is performed using the CAN protocol are received from the ECU 30, 35, the received frames are outputted sequentially in order of reception. In this output of each frame to the bus 10, each data is converted to data having the data format of the CAN protocol (i.e., the foregoing data frame in the standard format), and is outputted in accordance with the CAN protocol.

Further, the storage unit 44 stores a processing program for causing the control unit 46 to perform, as part of the relay processing, transmission processing for transmitting a data frame to the bus 10 where the communication is performed using the CAN protocol.

Figure 3:
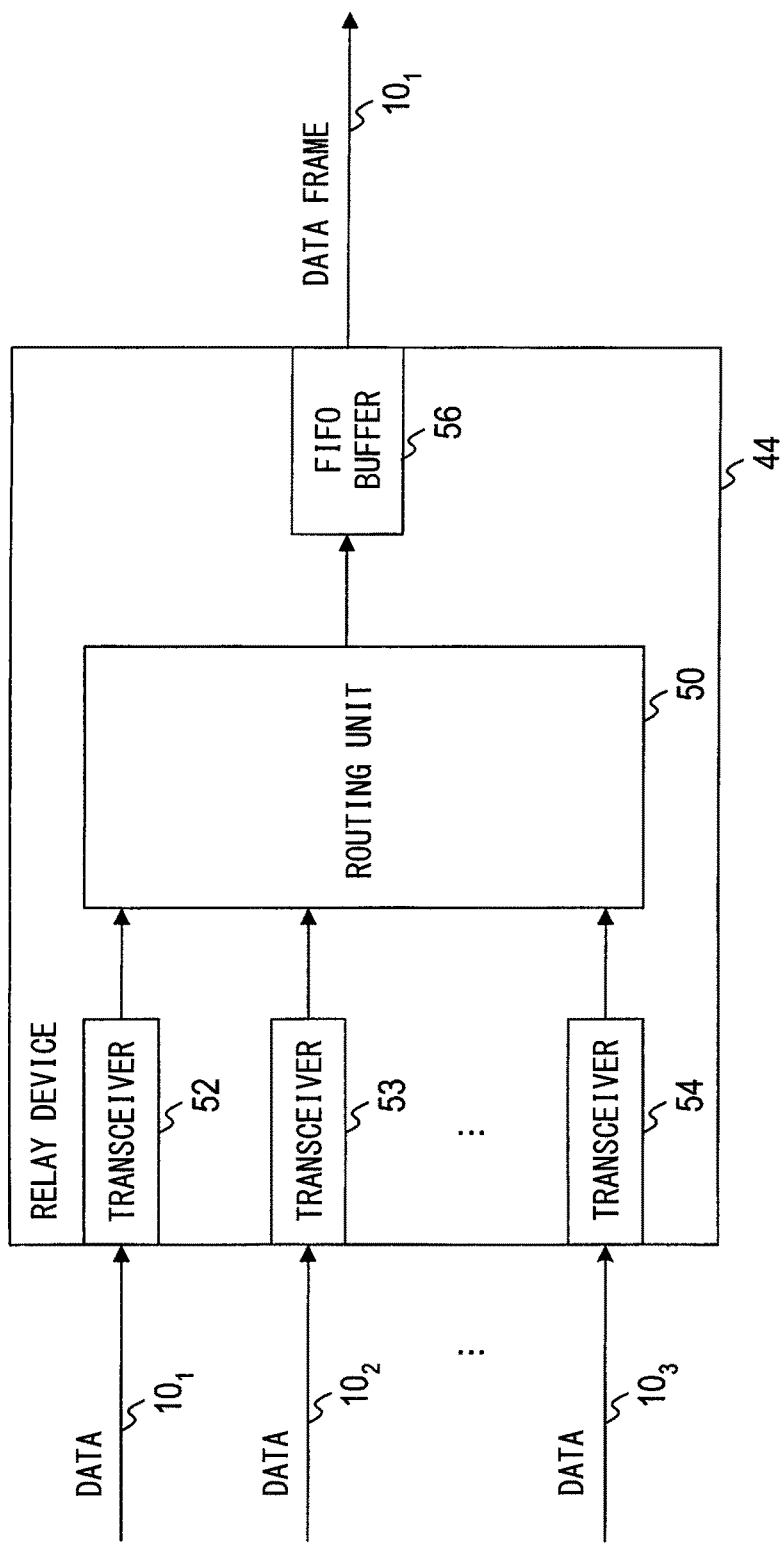
FIG. 3 is a functional block diagram of the relay device.

That is, when the relay device 40 receives a frame to be transmitted to the bus 10 from each of the buses 12, 14, the control unit 46 functions as a routing unit 50 for allocating the received frames so as to be outputted to the bus 10, as shown in FIG. 3. By being subjected to the relay processing, the frames from the buses 12, 14 are received by the communication unit 42 that functions as transceivers 52, 53, 54 to control transmission and reception of frames.

Figure 4:
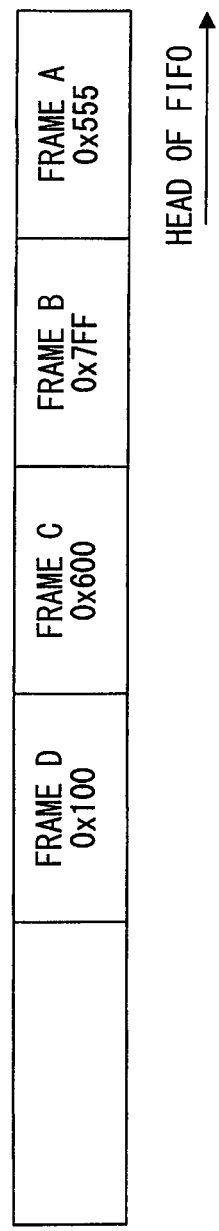
FIG. 4 is a view for explaining an outline of a FIFO buffer.

Then, the frames allocated by the control unit 46 that functions as the routing unit 50 are stored into a FIFO buffer 56 where a frame to be outputted to the bus 10 is stored. This FIFO buffer 56 is to be achieved by the control unit 46 that performs the relay processing, and as shown in FIG. 4, frames to be outputted to the bus 10 are stored sequentially in order of reception by the relay device 40. Note that "0x555", "0x7FF", and the like shown in FIG. 4 are hexadecimal notation of CAN-IDs.

Further, the frames stored into the FIFO buffer 56 are converted to data frames in the standard format of the CAN protocol in order of storage into the FIFO buffers 56, and start to be outputted.

<Transmission Processing>

Next, a description is given of the transmission processing performed by the control unit 46 of the relay device 40.

This transmission processing is activated when a data frame is stored into a head region of the FIFO buffer 56. Hereinafter, the data frame having been stored into the head region of the FIFO buffer 56 and come into a transmission waiting state is referred to as a transmission target frame.

Figure 5:
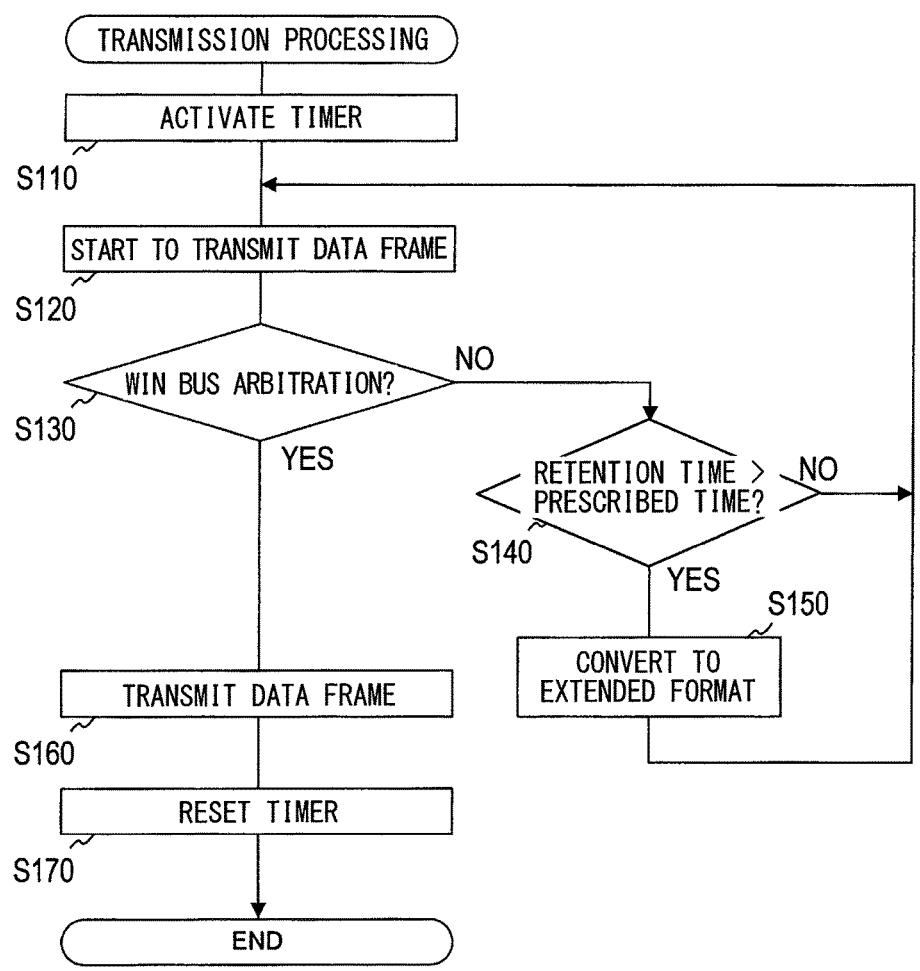
FIG. 5 is a flowchart for explaining a processing procedure for transmission processing that is performed by a control unit of the relay device.

When the transmission processing is activated, as shown in FIG. 5, the control unit 46 activates a timer for measuring a retention time representing a length of time when the transmission target frame continues to stay in the relay device 40 (S110). When confirming that the bus 10 is empty, the control unit 46 starts to transmit the transmission target frame to the bus 10 via the communication unit 42 (S120). This transmission of the transmission target frame to the bus 10 is carried out in order of the SOF and the standard ID.

Subsequently, the control unit 46 determines whether a transmission right of a data frame to the bus 10 has been obtained (S130). That is, in S130, when a signal level of the bus 10 that changes by bit units matches a signal level in the data frame transmitted by the relay device 40 itself, it is determined that the transmission right has been obtained (i.e., winning the bus arbitration). On the other hand, when the signal levels do not match, it is determined that the transmission right has not been obtained (i.e., losing the bus arbitration).

Thus, when the node having transmitted the data frame to the bus 10 is only the relay device 40, it is determined to have obtained the transmission right.

However, in the case of a data frame being transmitted from the ECU 20 simultaneously with transmission of the transmission target frame, it is determined that the transmission right has been obtained when a logical value of the standard ID (CAN-ID) in the transmission target frame having started to be transmitted to the bus 10 in S120 is smaller than a logical value of the CAN-ID in the data frame from the ECU 20 (hereinafter referred to as "arbitration target frame"). On the other hand, it is determined that the transmission right has not been obtained when the logical value of the standard ID (CAN-ID) in the transmission target frame having started to be transmitted to the bus 10 in S120 is larger than the logical value of the CAN-ID in the arbitration target frame.

When it is determined as a result of determination in S130 that the transmission right has been able to be obtained (S130: YES), the control unit 46 sequentially transfers the RTR, the IDE, the control field, and the data field in the transmission target frame to the bus 10 (S160). That is, when the transmission right is obtained, the transmission target frame is transmitted to the bus 10.

Subsequently, the control unit 46 stops the timer and resets the retention time (i.e., returns to "0") (S170).

Thereafter, the control unit 46 completes the present transmission processing, and when a new data frame is stored into the head region of the FIFO buffer 56, the transmission processing is activated again.

When the transmission right has not been able to be obtained as a result of the determination in S130 (S130: NO), the control unit 46 suspends transmission of the transmission target frame to the bus 10 and shifts the transmission processing to S140. In S140, the control unit 46 determines whether the retention time measured by the timer at the time of the shift to S140 is longer than a previously defined prescribed time. The prescribed time mentioned here is a length of time when the transmission target frame can be held in the head region of the FIFO buffer 56. This prescribed time may, for example, be about 20% to 50% of a defined cycle when the transmission target frame currently being the transmission target is to be transmitted repeatedly in that defined cycle.

When the retention time measured by the timer is equal to or shorter than the prescribed time as a result of the determination in S140 (S140: NO), the control unit 46 returns the transmission processing to S120. In S120, when confirming that the transmission of the arbitration target frame has been completed, the control unit 46 starts to transmit the transmission target frame to the bus 10 via the communication unit 42 (S120). The transmission of the transmission target frame to the bus 10 here is carried out in order of the SOF and the standard ID.

When the transmission right of the transmission target frame having started to be transmitted in S120 is obtained (S130: YES), the control unit 46 sequentially transfers the RTR, the IDE, the control field, and the data field in the transmission target frame to the bus 10 (S160). Subsequently, the control unit 46 stops the timer and resets the retention time (i.e., returns to "0") (S170).

Thereafter, the control unit 46 completes the present transmission processing, and when a new data frame is stored into the head region of the FIFO buffer 56, the transmission processing is activated again.

When the retention time measured by the timer is longer than the prescribed time as a result of the determination in S140 (S140: YES), the control unit 46 advances the transmission processing to S150. In S150, the control unit 46 performs change control to change the transmission target frame to a data frame in an extended format provided with the highest priority of all the data frames.

Figure 6:
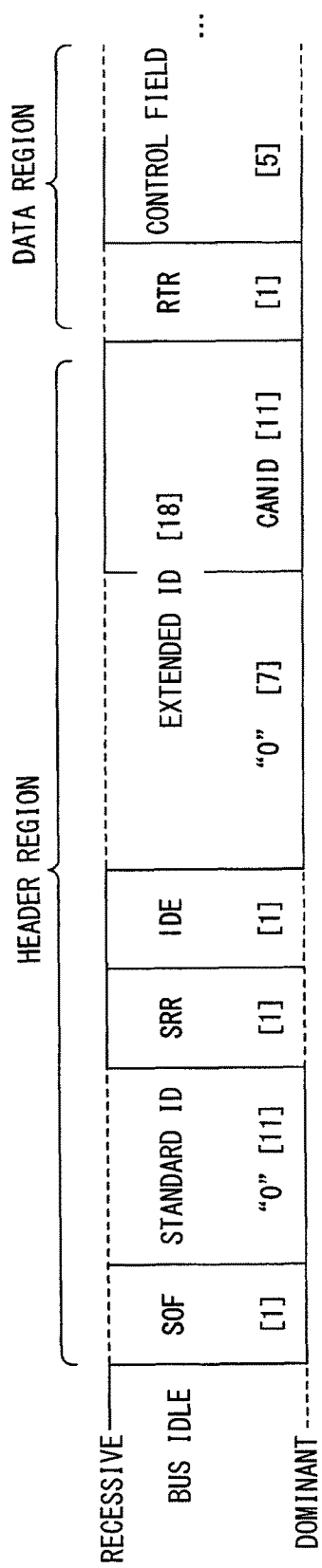
FIG. 6 is a view for explaining a data frame in an extended format in the CAN protocol.

As shown in FIG. 6, the data frame in the extended format system in the present embodiment includes at least a header region, and a data region that follows the header region. Note that a numerical value in a square bracket ([ ]) in FIG. 6 is a data size (bits) of each region.

Of these, the header region includes at least an SOF, a standard ID, an SRR, an IDE, and an extended ID in this order.

However, the SRR in the present embodiment is a 1-bit signal and fixed to the low level ("0", dominant). The IDE in the extended format is set to the high level ("1", recessive).

The extended ID is represented by binary data with a longer data length than the prescribed data length, and represents that the smaller the logical value of the binary data, the higher the priority. The data length of the extended ID in the present embodiment is 18 bits.

In S150 of the present embodiment, specifically, the control unit 46 sets logical values of a region corresponding to the standard ID to the minimum value (i.e., "00000000000 (binary notation)"). Further, in S150, the control unit 46 sets each of logical values of data for 7 bits from the head, of the regions corresponding to the extended ID, to "0" (i.e., sets the signal level to the low level (dominant)). Along with this, in S150, the control unit 46 makes each of logical values of data for 11 bits from the rear end, of the regions corresponding to the extended ID, match the logical value corresponding to the CAN-ID of the transmission target frame.

That is, the data frame in the extended format in the present embodiment is formed such that the logical values of data of both the region corresponding to the standard ID and the region for 7 bits from the head, of the regions corresponding to the extended ID, are set to "0", and the logical values of the data in the region for 11 bits from the rear end, of the regions corresponding to the extended ID, are set to the CAN-ID in the transmission target frame.

Thereafter, the control unit 46 shifts the transmission processing to S120.

In S120, when confirming that the transmission of the arbitration target frame has been completed, the control unit 46 starts to transmit the transmission target frame to the bus 10 via the communication unit 42 (S120).

In the present embodiment, the transmission target frame changed into the extended format can obtain the transmission right since having the highest priority of all the data frames (S130: YES).

Hence the control unit 46 sequentially transfers the control field and the data field in the transmission target frame to the bus 10 (S160). Subsequently, the control unit 46 stops the timer and resets the retention time (i.e., returns to "0") (S170).

Thereafter, the control unit 46 completes the present transmission processing, and when a new data frame is stored into the head region of the FIFO buffer 56, the transmission processing is activated again.

That is, in the transmission processing of the present embodiment, when the transmission target frame continues to lose and the retention time of the transmission target frame becomes longer than a prescribed time in the arbitration control, the transmission target frame is changed from the standard format to the extended format. Since this extended format is provided with the highest priority of all the data frames, even when the transmission target frame becomes a target of the arbitration control, the transmission right can be obtained, and the transmission target frame is transmitted to the bus 10.

That is, the relay device 40 having performed the transmission processing functions as the vehicle-mounted control device.

<Reception Processing>

Next, a description is given to the reception processing performed by the control unit 26 of each ECU 20.

This reception processing starts when the signal level of the bus 10 switches from the bus idle state to the low level (i.e., when the SOF in the data frame becomes dominant). Hereinafter, a data frame, in which the SOF is switched to being dominant and which the ECU 20 itself may receive from the bus 10, is referred to as a reception target frame.

Figure 7:
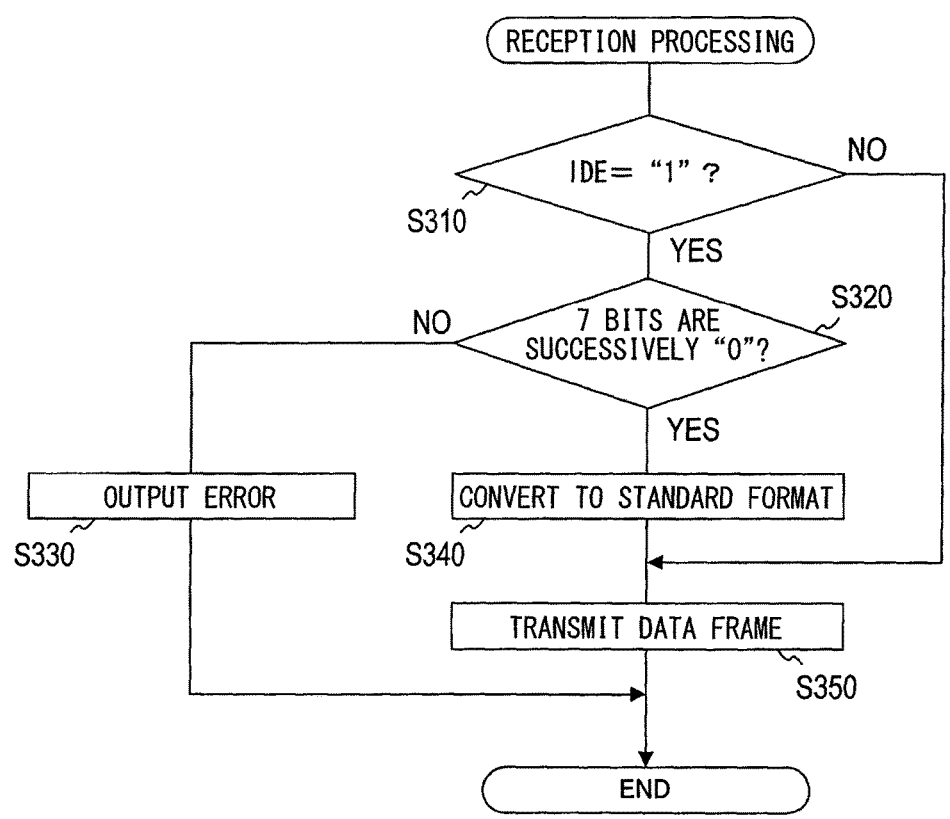
FIG. 7 is a flowchart for explaining a processing procedure for reception processing that is performed by a control unit of an ECU being one of the vehicle-mounted control devices.

When the reception processing is activated, as shown in FIG. 7, the control unit 26 determines whether the IDE in the reception target frame is recessive ("1") (S310). When the IDE in the reception target frame is not recessive as a result of the determination in S310 (S310: NO), the control unit 26 shifts the reception processing to S350 detailed later.

On the other hand, when the IDE in the reception target frame is recessive as a result of the determination in S310 (S310: YES), the control unit 26 determines whether or not the logical values of the region for 7 bits from the head, of the regions corresponding to the extended ID, are all "0" (S320). When not all the logical values of the region for 7 bits from the head, of the regions corresponding to the extended ID, are "0" as a result of the determination of S320 (S320: NO), the control unit 26 outputs to the bus 10 the indication that the reception target frame is an error (S330), and completes the present reception processing.

That is, when the IDE in the reception target frame is recessive, the reception target frame is likely to be a data frame in the extended format. However, when the logical values of the region for 7 bits from the head, of the regions corresponding to the extended ID, are not all "0", it is highly possible that the abnormality has occurred in the data, and in S330, the control unit 26 outputs to the bus 10 the indication that the reception target frame is an error.

On the other hand, when the logical values of the region for 7 bits from the head, of the regions corresponding to the extended ID, are all "0" as a result of the determination in S320 (S320: YES), the control unit 26 converts the format of the reception target frame to the standard format (S340). That is, in the reception processing, when the extended ID is included in the reception target frame, the format of the reception target frame is determined to be the extended format, and the reception target frame is converted to the standard format.

In S340, the control unit 26 removes the extended ID included in the reception target frame, and performs the conversion control to return the logical values of the standard ID of the reception target frame to the logical values of the CAN-ID. In the conversion control, specifically, both the logical values of the region corresponding to the standard ID and the logical values of the region for 7 bits from the head, of the regions corresponding to the extended ID, in the reception target frame are deleted. That is, in the conversion control, it is set such that the subsequent processing is performed taking as effective the logical values of the data for 11 bits from the rear end, of the logical values corresponding to the extended ID, namely only the CAN-ID.

Subsequently, in the reception processing, the control unit 26 receives subsequent data in the reception target frame (e.g., the control field, the data field), and transfers the data to other processing performed by the control unit 26 (S350). "Other processing" mentioned here includes, for example, known processing for determining whether the data itself included in the reception target frame is data required for the ECU 20.

When the IDE in the reception target frame is not recessive as a result of the determination in S310, namely when the reception target frame is in the standard format (S310: NO), the subsequent data in the reception target frame (e.g., the control field, the data field) is received while S320 to S340 are not performed, and the data is transferred to other processing performed by the control unit 26 (S350).

Subsequently, the control unit 26 completes the reception processing.

That is, in the reception processing of the present embodiment, it is determined whether the reception target frame is in the standard format or the extended format. When the reception target frame is in the standard format and is a data frame not to be received by the ECU 20, then, the control field, the data field, and the like in the reception target frame are received as they are.

On the other hand, when the reception target frame is in the extended format and the reception target frame is a data frame to be received by the ECU 20, it is returned to the standard format, and then the control field, the data field, and the like in the reception target frame are received.

Effects of Embodiment

As described above, in the relay device 40, when a waiting time (retention time) until transmission of a transmission target frame to the bus 10 reaches a prescribed time or longer, a priority of the transmission target frame is changed so as to be the highest of all the data frames. Hence the transmission target frame with the changed priority can reliably obtain a transmission right to the bus 10, and is transmitted to the bus 10.

Thus, according to the relay device 40, it is possible to prevent the transmission target frame from continuing to lose arbitration for a time significantly longer than a prescribed time, and thereby to achieve early transmission of the transmission target frame to the bus 10.

In other words, according to the relay device 40, a retention time required for transmission of a data frame can be reduced in a vehicle-mounted communication system in which communication is performed with the ECU 20 via a common bus and a priority is set to each data frame that is transmitted to the bus, and which follows a communications protocol defined such that the lower the priority, the longer the waiting time until transmission to the bus.

Note that in the transmission processing of the present embodiment, the change in the priority of the transmission target frame to the highest of all the data frames is achieved by inserting the extended ID into the transmission target frame.

The insertion of the extended format in the present embodiment is performed such that the logical values of data in both the entire region of the standard ID and the region for 7 bits from the head, of the regions corresponding to the extended ID, are set to "0", and the logical values of the data in the region for 11 bits from the rear end, of the regions corresponding to the extended ID, are set to the CAN-ID in the transmission target frame.

Thus, according to the transmission processing, it is possible to perform both the change in the priority of the transmission target frame to the highest of all the data frames, and the holding of the logical values of the CAN-ID included in the transmission target frame.

Furthermore, in the present embodiment, the priority of the transmission target frame is made the highest by setting the logical values to "0". According to the transmission processing, therefore, it is possible to improve the priority of the transmission target frame by the simple method.

Moreover, in the present embodiment, the reception processing is performed by the ECU 20. In this reception processing, when the reception target frame is in the extended format, the reception target frame is returned to the standard format.

Thus, according to the ECU 20, even when a data frame including the extended ID is received, it can be restored to an original data frame not including the extended ID (i.e., a data frame only including the standard ID). That is, according to the ECU 20, the data frame to be originally received can be received, to allow data to be normally communicated.

Other Embodiments

For example, although the main constituent to perform the transmission processing has been the relay device 40 in the vehicle-mounted communication system 1 of the above embodiment, the main constituent to perform the transmission processing in the present disclosure is not restricted thereto. That is, the main constituent to perform the transmission processing may be the ECU 20.

In this case, in the ECU 20 that communicates the data by use of the CAN protocol, the time required for transmission of a data frame to the bus 10 can be reduced.

Moreover, although the main constituent to perform the reception processing has been the ECU 20 in the vehicle-mounted communication system 1 of the above embodiment, the main constituent to perform the reception processing in the present disclosure is not restricted thereto. That is, the main constituent to perform the reception processing may be the relay device 40.

In this case, for example, even a data frame from the ECU 20 that performs the transmission processing of the above embodiment can be transmitted to a bus that transmits data by use of another protocol.

In the above embodiment, "00000000000 (binary notation)" is excluded as the logical values of the CAN-ID previously allocated to the data frame. However, in the present disclosure, "00000000000 (binary notation)" may be included in the logical values of the CAN-ID previously allocated to the data frame.

Although the description has been given on the assumption that different communication protocols are used for the respective buses 10, 12, 14 in the above embodiment, a common protocol may be used in the buses 10, 12, 14.

That is, in the present disclosure, so long as a device has a structure such that the device outputs a data frame to a bus that communicates data by use of the CAN protocol, a protocol used at the time of receiving the data frame to be outputted may be any protocol.

Further, the present disclosure can be realized in a variety of forms other than the foregoing vehicle-mounted control device, such as a program for functioning a computer as the vehicle-mounted control device, a recording medium where the program is recorded, and a communication method in the vehicle-mounted control device.

The present disclosure includes the following aspects.

In one aspect of the present disclosure, a vehicle-mounted control device that communicates with at least one vehicle-mounted node via a common bus, sets a priority to a data frame that is outputted from the vehicle-mounted node, and follows a communication protocol defined such that the lower the priority, the longer the waiting time until transmission to the bus, the device including: an arbitration device that performs arbitration control to arbitrates transmission of a transmission target frame such that a data frame to be transmitted to the bus is taken as the transmission target frame and, in the case of collision of the transmission target frame with the output data frame from the vehicle-mounted node, suspends the transmission of the transmission target frame to the bus when the priority of the transmission target frame is lower than the priority of the output data frame from the vehicle-mounted node, and continues the transmission of the transmission target frame to the bus when the priority of the transmission target frame is higher than the priority of the output data frame from the vehicle-mounted node; and a change device that performs change control to change the priority of the transmission target frame so as to be the highest of all the data frames when the transmission of the transmission target frame is suspended for a time equal to or longer than a previously defined prescribed time as a result of the arbitration control by the arbitration device.

That is, in the present vehicle-mounted control device, when a waiting time until transmission of a transmission target frame to the bus reaches a prescribed time or longer, a priority of the transmission target frame is changed so as to be the highest of all data frames. Hence the transmission target frame with the changed priority can reliably obtain a transmission right to the bus, and is transmitted to the bus.

Thus, according to the vehicle-mounted control device, it is possible to prevent the transmission target frame from continuing to lose arbitration for a time significantly longer than a prescribed time, and thereby to achieve early transmission of the transmission target frame to the bus.

In other words, according to the above device, it is possible to reduce a retention time required for transmission of a data frame in a vehicle-mounted communication system in which a plurality of vehicle-mounted nodes communicate with each other via a common bus and a priority is set to each data frame that is transmitted from the vehicle-mounted node, and which follows a communications protocol defined such that the lower the priority, the longer the waiting time until transmission to the bus.

Alternatively, the data frame may represent contents of data in the data frame and identification information of the vehicle-mounted node or the vehicle-mounted control device which has transmitted the data frame, and have a standard ID being a region that includes data information functioning as the priority. When the transmission of the transmission target frame is suspended for a time equal to or longer than the prescribed time as a result of the arbitration by the arbitration device, the change device performs, as the change control, a change in the priority represented by the standard ID of the transmission target frame to the highest of all the data frames, and addition to the transmission target frame an extended ID as a region including the data information of the priority having been changed to the highest.

According to such a vehicle-mounted control device, it is possible to perform both the change in the priority of the transmission target frame to the highest of all the data frames, and the holding of the data information included in the transmission target frame.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle-mounted control device which communicates with at least one vehicle-mounted node via a common bus, sets a priority to a data frame that is outputted from the at least one vehicle-mounted node, and follows a communication protocol defined in such a manner that the lower the priority, the longer a waiting time until transmission to the bus, the vehicle-mounted control device comprising:

a memory; and a processor coupled to the memory and configured to:

perform arbitration control to arbitrate transmission of a transmission target frame in such a manner that: a data frame to be transmitted to the bus is defined as the transmission target frame, wherein the data frame represents identification information of a content of data in the data frame and information of the vehicle-mounted node or the vehicle-mounted control device which has transmitted the data frame, and has a standard ID being a region that includes data information functioning as the priority, when the transmission target frame collides with an output data frame from the vehicle-mounted node, and the priority of the transmission target frame is lower than the priority of the output data frame from the vehicle-mounted node, suspend the transmission of the transmission target frame to the bus, and when the transmission target frame collides with the output data frame from the vehicle-mounted node, and the priority of the transmission target frame is higher than the priority of the output data frame from the vehicle-mounted node, continue the transmission of the transmission target frame to the bus;

perform a change control to change the priority of the transmission target frame so as to be the highest of all data frames when the transmission of the transmission target frame is suspended for a time equal to or longer than a preliminary defined prescribed time as a result of the arbitration control;

when the transmission of the transmission target frame is suspended for a time equal to or longer than the prescribed time as a result of the arbitration, perform the change control in such a manner that the priority represented by the standard ID of the transmission target frame is changed to the highest of all data frames, and an extended ID as a region including the data information of the priority being changed to the highest is added to the transmission target frame, wherein the standard ID is represented by binary data with a prescribed data length, and represents that the smaller a logical value of the binary data, the higher the priority, perform the change control to change the logical value of the binary data with the prescribed data length included in the standard ID to be a minimum value, wherein the extended ID is represented by binary data with a data length longer than the prescribed data length, and represents that the smaller the logical value of the binary data, the higher the priority, and perform the change control to insert the data information of the standard ID by an amount corresponding to the prescribed data length from a rear end of the extended ID, and to set a logical value in a remaining region other than the data information of the standard ID in the extended ID to be a minimum value.

2. A vehicle-mounted control device which communicates with at least one vehicle-mounted node via a common bus, sets a priority to a data, frame that is outputted from the at least one vehicle-mounted node, and follows a communication protocol defined in such a manner that the lower the priority, the longer a waiting time until transmission to the bus, the vehicle-mounted control device comprising:

a memory; and
a processor coupled to the memory and configured to:
perform arbitration control to arbitrate transmission of a transmission target frame in such a manner that a data frame to be transmitted to the bus is defined as the transmission target frame, wherein the data frame represents identification information of a content of data in the data frame and information of the vehicle-mounted node or the vehicle-mounted control device which has transmitted the data frame, and has a standard ID being a region that includes data information functioning as the priority, when the transmission target frame collides with an output data frame from the vehicle-mounted node, and the priority of the transmission target frame is lower than the priority of the output data frame from the vehicle-mounted node, suspend the transmission of the transmission target frame to the bus, and when the transmission target frame collides with the output data frame from the vehicle-mounted node, and the priority of the transmission target frame is higher than the priority of the output data frame from the vehicle-mounted node, continue the transmission of the transmission target frame to the bus;

perform a change control to change the priority of the transmission target frame so as to be the highest of all data frames when the transmission of the transmission target frame is suspended for a time equal to or longer than a preliminary defined prescribed time as a result of the arbitration control;

when the transmission of the transmission target frame is suspended for a time equal to or longer than the prescribed time as a result of the arbitration, perform the change control in such a manner that the priority represented by the standard ID of the transmission target frame is changed to the highest of all data frames, and an extended ID as a region including the data information of the priority being changed to the highest is added to the transmission target frame, set a data frame received from the bus as a reception target frame, and determine whether the reception target frame includes the extended ID, and perform a conversion control to remove the extended ID included in the reception target frame, and to return a standard ID of the reception target frame to the data information of the reception target frame when the extended ID is included as a result of the determination.

3. The vehicle-mounted control device according to claim 1, wherein:
the vehicle-mounted control device is a gateway that relays transmission and reception of the data frame between the vehicle-mounted nodes.

4. The vehicle-mounted control device according to claim 1, wherein:
the communications protocol is a CAN protocol.

* * * * *